United States Patent
Ooi et al.

(10) Patent No.: US 7,689,941 B1
(45) Date of Patent: Mar. 30, 2010

(54) WRITE MARGIN CALCULATION TOOL FOR DUAL-PORT RANDOM-ACCESS-MEMORY CIRCUITRY

(75) Inventors: Teng Chow Ooi, Penang (MY);
Yanzhong Xu, Santa Clara, CA (US);
Jeffrey T. Watt, Palo Alto, CA (US);
Haiming Yu, San Jose, CA (US)

(73) Assignee: Altera Corporation, San Jose, CA (US)

( * ) Notice: Subject to any disclaimer, the term of this patent is extended or adjusted under 35 U.S.C. 154(b) by 409 days.

(21) Appl. No.: 11/803,091

(22) Filed: May 11, 2007

Related U.S. Application Data

(60) Provisional application No. 60/810,353, filed on Jun. 1, 2006.

(51) Int. Cl.
*G06F 17/50* (2006.01)

(52) U.S. Cl. ............... 716/2; 716/1; 716/3; 716/18; 703/14

(58) Field of Classification Search ............ 716/1, 716/2, 18
See application file for complete search history.

(56) References Cited

U.S. PATENT DOCUMENTS

| | | | |
|---|---|---|---|
| 5,508,957 A | 4/1996 | Momodomi et al. | |
| 5,532,962 A | 7/1996 | Auclair et al. | |
| 5,657,332 A | 8/1997 | Auclair et al. | |
| 6,185,141 B1 | 2/2001 | Hoshita et al. | |
| 7,050,345 B1 * | 5/2006 | Sheppard | 365/206 |
| 7,054,188 B2 | 5/2006 | Takizawa et al. | |

OTHER PUBLICATIONS

Takeda, K. et al. "Redefinition of Write Margin for Next-Generation SRAM and Write-Margin Monitoring Circuit," 2006 IEEE Int. Solid State Circuits Conference, pp. 630, 631, and 678.

* cited by examiner

*Primary Examiner*—Thuan Do
(74) *Attorney, Agent, or Firm*—Treyz Law Group; G. Victor Treyz; Nancy Y. Ru

(57) ABSTRACT

Systems and methods are provided for computing write margins for dual-port memory. A design for a dual-port memory array cell is generated using a circuit design tool. A user modifies the design of the dual-port memory array cell to incorporate two voltage sources. The voltage sources are used to represent differential noise on the memory cell. A write margin calculation tool uses a circuit simulation tool to perform transient simulations of write-during-read operations on the modified dual-port memory array cell. During the transient simulations, the voltage level on the voltages sources is systematically varied. The write margin for the dual-port memory is determined by analyzing the results of the transient simulations for each of the voltage levels used for the voltage sources.

20 Claims, 11 Drawing Sheets

WRITE MARGIN CALCULATION TOOL FOR DUAL-PORT RANDOM-ACCESS-MEMORY CIRCUITRY

This application claims the benefit of provisional patent application No. 60/810,353, filed Jun. 1, 2006, which is hereby incorporated by reference herein in its entirety.

BACKGROUND

This invention relates to dual-port random-access-memory circuits, and more particularly, to determining write margins for dual-port random-access memory circuits.

Random-access memory is used in a variety of integrated circuits, such as stand-alone memory chips, programmable logic device integrated circuits, and application-specific integrated circuits. Random-access memory is formed from an array of random-access memory cells. Memory arrays on a programmable logic device typically range in size from a few kilobits to about a megabit or more.

Both single-port and dual-port random-access-memory arrays are used.

Single-port random access memory arrays are accessed using a single port. The single port can be used for read operations or can be used for write operations, but cannot be used for simultaneous read and write operations.

Dual-port random-access memory arrays have two independent ports. If desired, one port can be used for write operations while the other port is used for read operations. The ability to concurrently read and write data allows dual-port random-access-memory arrays to be used in applications such as clock conversion first-in-first-out (FIFO) circuits. In a typical scenario, data is written into a FIFO using one clock signal and is read out of the FIFO using another clock signal.

Single-port memory array circuits are characterized by read and write margin figures of merit. The write margin of a single-port memory array is generally expressed as a voltage. The write margin voltage for a given design is indicative of the tolerance of the design to imperfections due to fabrication variations and operating variations such as changes in temperature and voltage. Designs with large margins are robust. Designs with negative margins are expected to fail.

Because there are numerous possible variations in components and operating conditions for a dual-port memory array, accurate calculation of the read and write margin for the array can be critical. If a logic designer is unable to use read and write margin calculations to evaluate how a given memory design will perform, it will not be possible to properly design a complex memory array.

Conventional methodologies for calculating single-port write margins have been applied to dual-port memory arrays. Unfortunately, write margins that have been calculated in this way have proven to be unreliable. For example, application of conventional single-port margin calculation techniques to a dual-port memory may produce write margin values that are negative, even when the dual-port memory array operates properly.

It would therefore be desirable to be able to calculate write margins satisfactorily for dual-port memory arrays.

SUMMARY

In accordance with the present invention, methods and system are provided for computing write margins for dual-port memory arrays. A write margin calculation tool and tools such as a circuit design tool and circuit simulation tool are implemented on a computer system. A logic designer who desires to evaluate a given dual-port memory array design creates circuit specifications for a dual-port memory array cell using the circuit design tool.

To evaluate the write margin of the cell, the cell design is modified to incorporate two direct current (DC) voltage sources. The voltage sources represent differential noise on the dual-port memory array cell and have an associated voltage level. The write margin calculation tool systematically varies the voltage level on the voltage sources while using the circuit simulation tool to perform transient simulations of illustrative write-during-read operations on the memory cell. A list is created indicating which write operations are successful and which write operations fail. The write margin is defined as the largest voltage level on the voltage sources that the design will tolerate when performing write-during-read operations.

Further features of the invention, its nature and various advantages will be more apparent from the accompanying drawings and the following detailed description of the preferred embodiments.

DETAILED DESCRIPTION

The present invention relates to computing write margins for dual-port memories. The dual-port memory circuitry of the present invention may be used in any suitable integrated circuit. For example, the dual-port memory circuitry may be used in an integrated circuit memory device or an application specific integrated circuit (ASIC). The dual-port memory circuitry may also be used in a programmable logic device integrated circuit or a programmable integrated circuit of a type that is not traditionally referred to as a programmable logic device such as a digital signal processors containing programmable logic or a custom integrated circuit containing regions of programmable logic.

Figure 1:
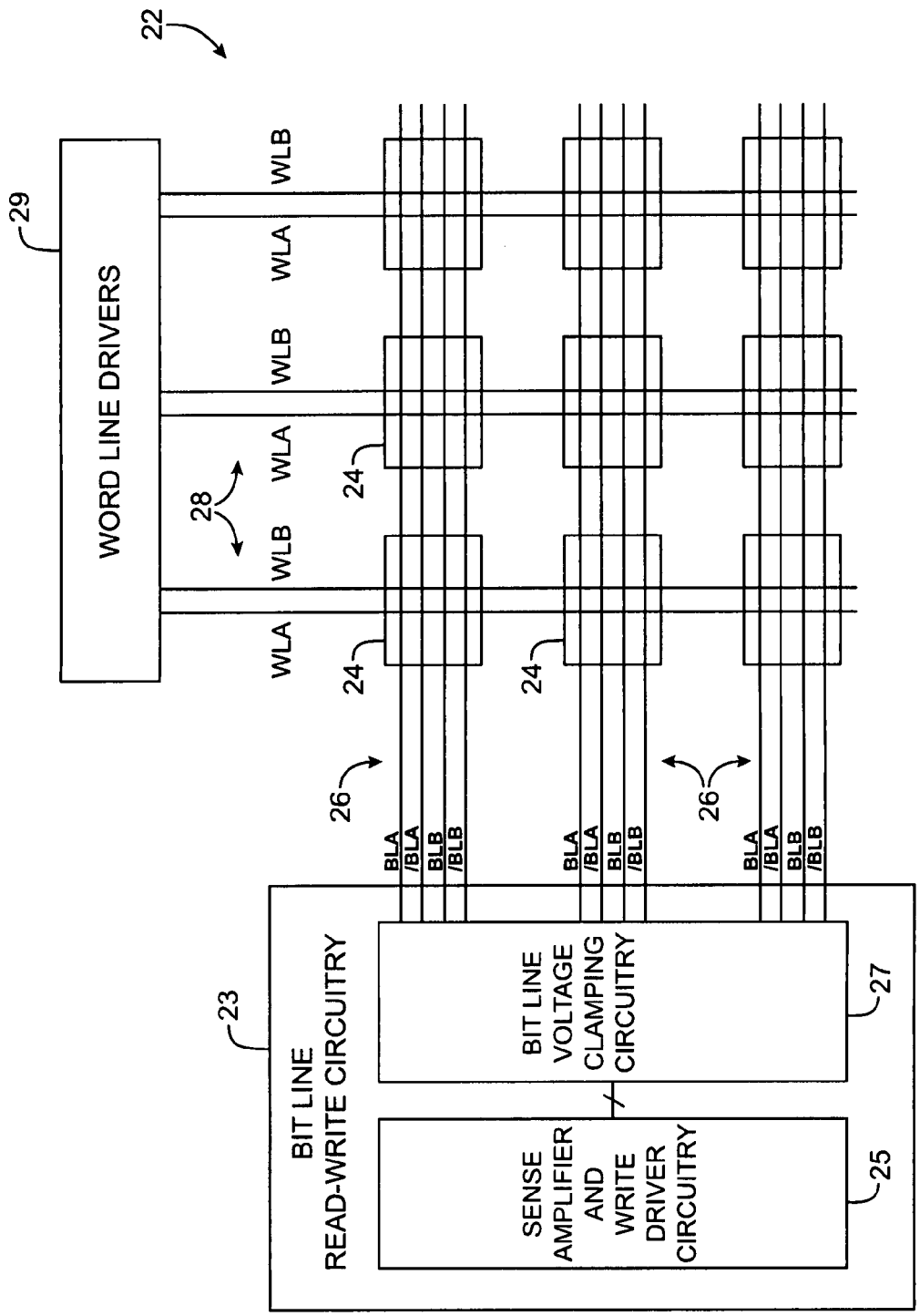
FIG. 1 is a diagram of an illustrative dual-port memory array in accordance with the present invention.

An illustrative dual-port memory array 22 is shown in FIG. 1. Memory array 22 contains volatile memory elements such as random-access-memory (RAM) cells 24. Memory arrays such as memory array 22 of FIG. 1 are used to store data signals during normal operation of the integrated circuit in which they are formed. The memory arrays need not all be the same size. For example, small, medium, and large memory arrays 22 may be included on the same integrated circuit. There may, for example, be hundreds of small memory arrays each having a capacity of about 512 bits, two to nine large memory arrays each having a capacity of about half of a megabit, and an intermediate number of medium size memory arrays each having a capacity of about 4 kilobits to 8 kilobits. These are merely illustrative memory array sizes and quantities. In general, there may be any suitable size and number of memory arrays 22 on an integrated circuit.

Dual-port memory arrays 22 have two independent ports for writing and reading data. In a typical scenario, on-chip data or externally-generated data is stored in a dual-port memory array 22. Data is stored by writing the data into memory cells at a particular address within the memory array. The stored data can be accessed by performing a read operation. Because the memory array has two ports, one port may be used to perform read operations at the same time that the other port is being used to perform read or write operations. Separate clocks may be used for each port.

Data is written into memory cells 24 during write operations and read from memory cells 24 during read operations. The illustrative memory array 22 of FIG. 1 has three rows and three columns of memory cells 24. In an actual integrated circuit, memory array 22 is typically larger. For example, an 8K memory array may have 256 columns and 32 rows of memory cells 24.

Array 22 has bit lines 26 and word lines 28. Bit lines 26 and word lines 28 are used to select which cells 24 are accessed. For example, if a particular word line 28 is asserted during a read operation, the data stored in the cells 24 that are connected to that word line will pass their stored data onto the bit lines 26. During a write operation, data that is to be written into array 22 is placed on bit lines 26 while an appropriate word line 28 is asserted.

Figure 2:
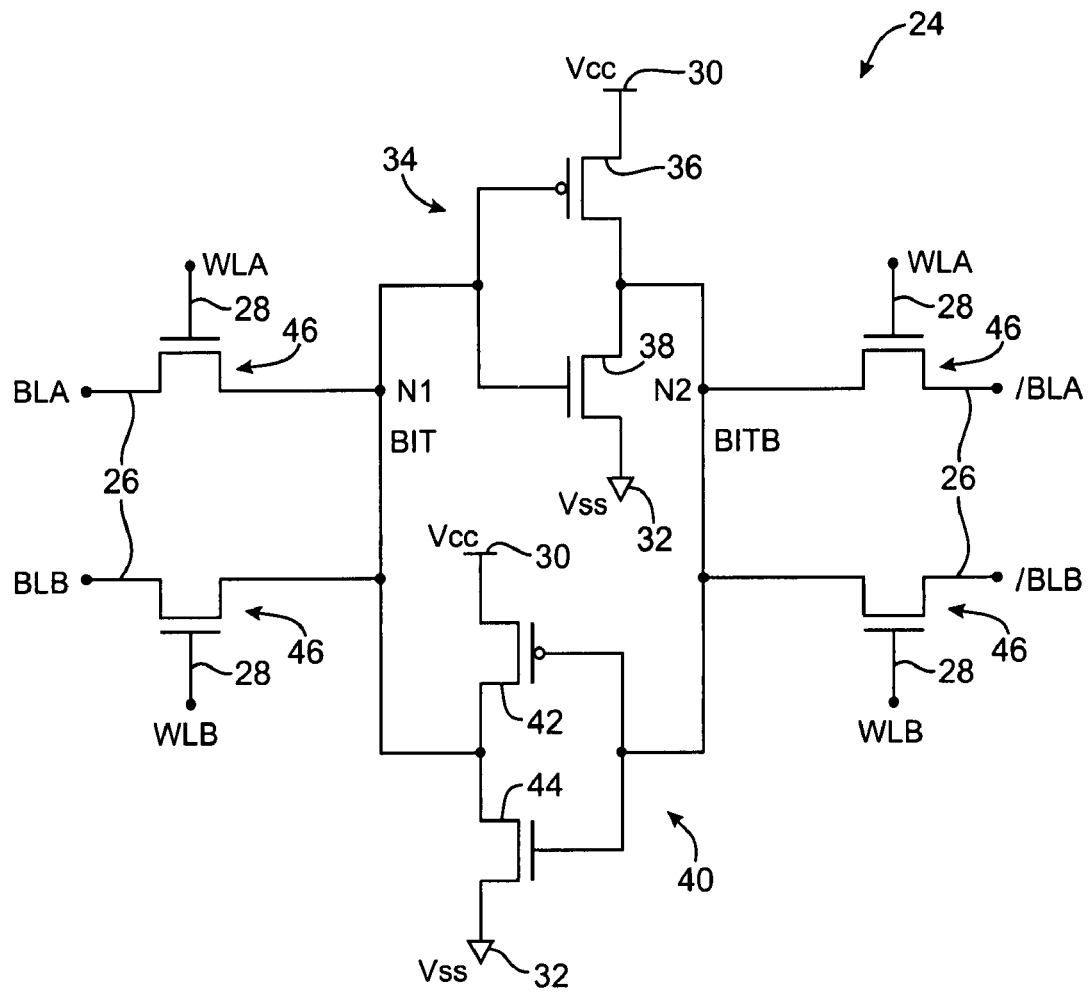
FIG. 2 is a diagram of an illustrative memory cell in a dual-port memory array in accordance with the present invention.

Because the array 22 has two ports, there are two word lines 28 associated with each column of memory cells 24. The first word line in each column of cells 24 in FIG. 2 is labeled WLA to indicate that it is associated with a first port ("port A"). The second word line in each column of cells 24 in FIG. 2 is labeled WLB to indicate that it is associated with a second port ("port B"). Control circuitry asserts the word lines in each column individually.

Memory array 22 preferably uses a differential bit line arrangement in which each row of the memory array has four associated bit lines. One differential pair of bit lines in each row is associated with the first port and the other differential pair of bit lines in each row is associated with the second port. As shown in FIG. 1, the pair of bit lines labeled BLA and /BLA in each row are associated with the first port (port A), whereas the pair of bit lines labeled BLB and /BLB in each row are associated with the second port.

Word line drivers 29 are used to selectively assert word line signals WLA and WLB when addressing a column of array 22. There is a separate word line driver associated with each of lines 28.

Bit line read-write circuitry 23 is used to drive bit line signals onto bit lines 26 during write operations and is used to sense bit line signals from cells 24 during read operations. Sense amplifier and write driver circuitry 25 contains differential sense amplifiers. Each differential sense amplifier senses read bit line signals from a respective pair of bit lines 26 and generates a corresponding digital output. Sense amplifiers are typically responsive to voltage differentials on their inputs that are about 10% of Vcc. If a voltage difference greater than this amount develops across a pair of bit lines 26, the output of the sense amplifier will be either a valid high or low logic signal, depending on the polarity of the bit line signals. Write drivers in circuitry 25 are used to drive bit line signals onto bit lines 26. There is a bit line driver associated with each bit line 26.

Optional bit line voltage clamping circuitry 27 is used to limit voltage swings on bit lines 26. Clamping circuitry 27 limits the voltage pull-down effect on the bit lines 26 during read operations. The clamping circuitry may, as an example, prevent read bit line voltages from dropping below about 25-30% of their high values during a read (e.g., to about 0.8 to 0.9 volts from 1.1 volts), rather than dropping to extremely low levels (e.g., 300 mV). Because the read port bit line voltages and internal nodes of the memory cells fall to only moderately low voltages, the write bit line drivers can successfully overcome these voltages when needed during a concurrent write operation.

An illustrative dual-port memory cell 24 is shown in FIG. 2. Memory cell 24 has two cross-coupled inverters 34 and 40. Inverter 34 has p-channel metal-oxide-semiconductor (PMOS) transistor 36 and n-channel metal-oxide-semiconductor (NMOS) transistor 38. Inverter 40 has PMOS transistor 42 and NMOS transistor 44. The inverters 34 and 40 are powered with a positive power supply voltage Vcc supplied to terminals 30 and a ground power supply voltage Vss supplied to terminals 32. In a typical integrated circuit, Vcc may be 1.07 volts and Vss may be 0 volts. In general, any suitable values of Vcc and Vss may be used.

Memory cell 24 has four associated bit lines 26. During read operations through port A, data is read out of memory cell 24 over bit lines BLA and /BLA and is sensed using associated differential sense amplifier circuitry. During write operations through port A, data on bit lines BLA and /BLA is loaded into memory cell 24. Similarly, data is read out of memory cell 24 over bit lines BLB and /BLB during read operations through port B. During write operations through port B, data on bit lines BLB and /BLB is loaded into memory cell 24.

Memory cell 24 has four address transistors 46. One pair of address transistors 46 is controlled by the word line for port A (WLA) and is associated with port A. The other pair of address transistors 46 is controlled by the word line for port B (WLB) and is associated with port B. When WLA is asserted, the gates of the port A address transistors go high and the port A address transistors are turned on. With the port A transistors turned on, the bit lines BLA and /BLA are connected to nodes N1 and N2, respectively. When WLB is asserted, the gates of the port B address transistors go high and the port B address transistors are turned on. With the port B address transistors turned on, the bit lines BLB and /BLB are connected to nodes N1 and N2, respectively.

As shown in FIG. 2, the signal on node N1 is labeled "BIT" and represents the contents of memory cell 24, whereas the signal on node N2 is labeled "BITB" and represents the inverse of the signal BIT. When a logic one is stored in cell 24, node N1 is high (e.g., Vcc) and node N2 is low (e.g., Vss). When a logic zero is stored in cell 24, node N1 is low (e.g., Vss) and node N2 is high (e.g., Vcc).

During a read operation, the two address transistors associated with a given port are turned on, so that the contents of the cell may be sensed over a differential bit line pair 26. For example, during a read operation on port A, word line signal WLA is asserted, which turns on the port A address transistors, so that signals BIT and BITB are conveyed to a differential sense amplifier over bit lines BLA and /BLA, respectively.

During a write operation, the two address transistors associated with a given port are similarly turned on using a word line. For example, during a write operation on port B, word line signal WLB is asserted, which turns on the port B address transistors. The data that is to be loaded into cell 24 is provided by a bit line driver over differential bit lines BLB and /BLB. When the bit lines BLB and /BLB are connected to nodes N1 and N2 by turning on the port B address transistors, the data on lines BLB and /BLB is driven into the memory cell 24. For example, if a logic one is being loaded into cell 24, node N1 will be driven high (e.g., Vcc) by a high signal on bit line BLB while node N2 is being driven low (e.g., Vss) by a low signal on complementary bit line /BLB.

It is often desired to operate the two ports of a dual-port memory array asynchronously. In this type of situation, each port uses an independent clock. For example, a dual-port memory array that is used as a clock conversion FIFO circuit uses a first clock (CLKA) for port A and uses a second clock (CLKB) for port B. Because there is no fixed rate and phase relationship between CLKA and CLKB, overlaps sometimes result between read and write events.

When computing the write margin for a dual-port memory array, it is important to consider worst-case scenarios. Consider, as an example, a situation in which a write operation is being performed on port A. When a read operation is performed, a word line is asserted. Following a small delay, the sense amplifier in each row senses the resulting bit line voltages and, using an internal register, captures sensed data. If the write on port A is performed while port B is idle, the memory cell will function without any performance degradations due to read-and-write overlap. Operations in which two writes are performed simultaneously are not supported. If a read operation is initiated after the write on port B has been successfully completed (i.e., if the word line goes high and the sense amplifier register captures its data after the word line for the write operation has been deasserted), the write operation will be completed successfully.

The worst-case scenario occurs when the write operation occurs during a read. In this situation, the write word line is asserted while the read word line is still asserted, which can lead to performance degradations significant enough to cause the write operation to fail. In particular, during the read operation on port B, a word line such as word line WLB of FIG. 2 is asserted, which turns on the port B address transistors. Turning on the port B address transistors connects the port B bit lines to nodes such as nodes N1 and N2 in FIG. 2. Loading effects due to the presence of these bit lines make it difficult for the desired data to be written into the cell when the word line WLA on port A is asserted.

To assess whether the write operations under these overlap conditions will be successful, circuit designers compute the write margin for the dual-port memory cell. The write margin is a figure of merit that indicates whether the cell has sufficient tolerance to operate successfully under a variety of manufacturing and operating conditions. If the write margin is too low, the cell can be redesigned. Performing circuit simulations for all expected variations in process, temperature, and voltage is generally not feasible, because there are an extremely large number of potential variables that affect circuit performance. As a result, a simplified approach is desired in which a single FIGURE of merit (the write margin) can be calculated.

Conventional approaches for evaluating dual-port memory arrays rely on the single-port write margin methodology. An example involving computation of a write margin for a single-port memory array using this technique is shown in FIGS. 3, 4, 5, and 6.

Figure 3:
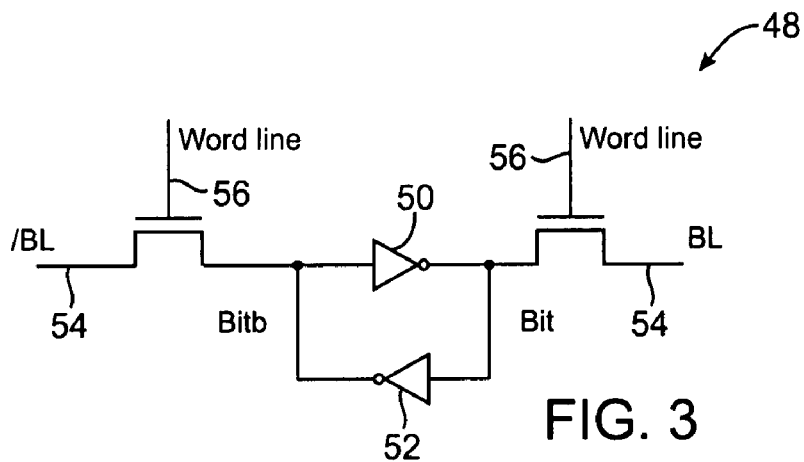
FIG. 3 is a diagram of a single-port memory cell.

A single-port memory array cell 48 is shown in FIG. 3. Memory cell 48 has cross-coupled inverters 50 and 52. To perform a write operation, complementary bit line signals BL and /BL are driven onto bit lines 54 while word lines 56 are asserted. Internal nodes of cell 48 are labeled "bit" and "bitb". The signal "bit" represents the contents of cell 48.

Figure 4:
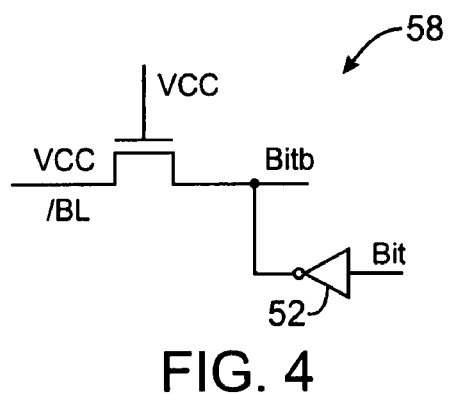
FIGS. 4 and 5 are diagrams showing portions of the circuit of FIG. 3 that are involved in single-port write margin calculations.
Figure 5:
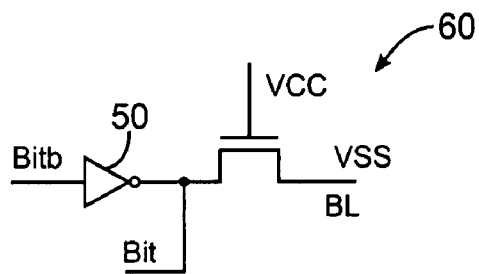

To compute the write margin for cell 48 using the single-port methodology, cell 48 is divided into two circuits 58 and 60, as shown in FIGS. 4 and 5. The circuits 58 and 60 are then analyzed to construct the graph 62 of FIG. 6. In graph 62, the height of the box 68 that separates traces 64 and 66 represents the write margin for cell 48.

Figure 6:
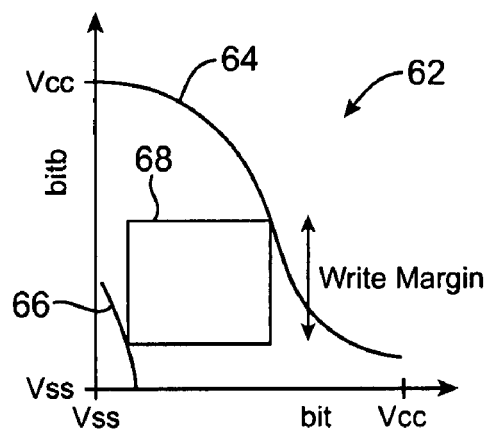
FIG. 6 is a diagram showing how the write margin for the single-port memory array cell of FIG. 3 is calculated using the circuit portions of FIGS. 4 and 5.

In the example of FIGS. 4 and 5, signal /BL is shown as being held at Vcc, while signal BL is shown as being held at Vss. These signal values correspond to the writing of a logic zero into the cell 48. Trace 64 of FIG. 6 is generated by computing the value of the signal bitb that results when the value of the signal bit is varied from Vss to Vcc in circuit 58 of FIG. 4. Trace 66 of FIG. 6 is generated by computing the value of the signal bit that results when the signal bitb is varied from Vss to Vcc in circuit 60 of FIG. 5.

Inverters 50 and 52 contain NMOS and PMOS transistors, as described in connection with inverters 34 and 40 of FIG. 2. The PMOS transistors are generally about four times weaker than the NMOS transistors. This makes it harder to produce a one at the output of an inverter than a logic zero. As shown by comparing traces 64 and 66, inverter 52 succeeds in overcoming the high /BL signal and driving signal bitb low at high values of bit, whereas inverter 50 has difficulty in overcoming the low BL signal and driving signal bit high at low values of bitb. This asymmetry leads to the gap between traces 64 and 66 and produces a non-negligible write margin (in this example).

The conventional write margin computation scheme of FIGS. 3, 4, 5, and 6 generally works satisfactorily for single-port memories. However, this approach works poorly for dual-port memories. An illustrative attempt to compute the write margin for a dual-port memory using the conventional single-port write margin arrangement of FIGS. 3, 4, 5, and 6 is described in connection with FIGS. 7, 8, 9, and 10.

Figure 7:
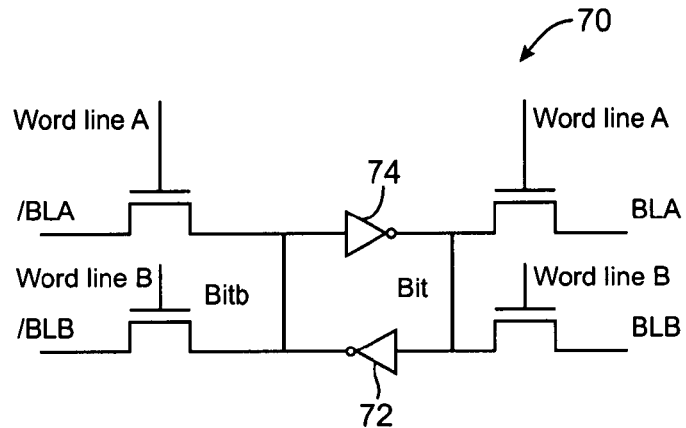
FIG. 7 is a diagram of a dual-port memory cell for which a write margin may be calculated in accordance with the present invention.

A dual-port memory circuit 70 is shown in FIG. 7. Dual-port memory circuit 70 has cross-coupled inverters 72 and 74. Following the conventional single-port write margin approach, circuit 70 is divided into two circuits 76 (FIG. 8) and 78 (FIG. 9). The write margin is computed for the worst-case scenario in which a write is performed during a read. Under these conditions, the voltage of /BLA is Vcc and the voltage of BLA is Vss, simulating the writing of a zero into cell 70 on port A. Before reading data out of port B, the bit lines /BLB and BLB are precharged to Vcc. During the read operation on port B, the address transistors on port B are turned on, which exposes the cell to the loading effects of the read bit lines. The voltages of the read bit lines /BLB and BLB are clamped by the voltage clamping circuitry 27 (in this example), so signal /BLB falls to its clamped level (e.g., 800 mV). (If the clamping circuitry 27 is not used, signal /BLB will be about 400 mV.)

Figure 8:
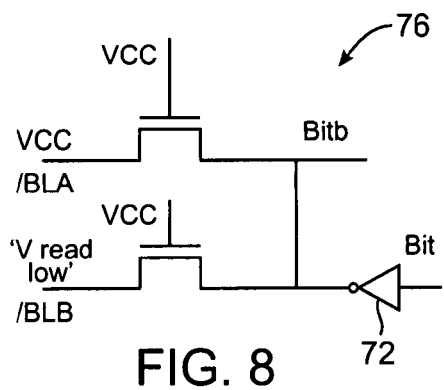
FIGS. 8 and 9 are diagrams showing portions of the circuit of FIG. 7 that are involved in applying single-port write margin calculations to a dual-port memory array cell.
Figure 9:
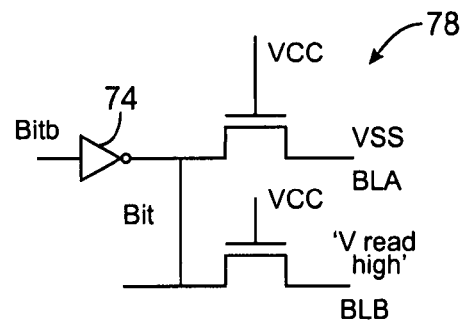
Figure 10:
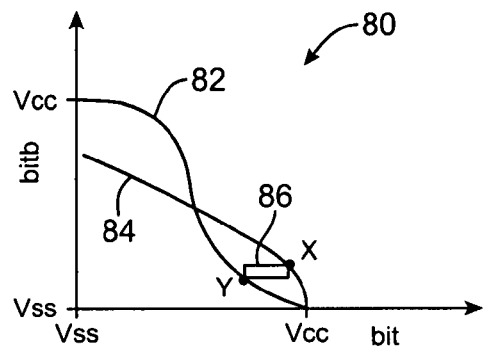
FIG. 10 is a diagram showing how the write margin for the dual-port memory array cell of FIG. 3 is calculated using the circuit portions of FIGS. 8 and 9 using a single-port memory array write margin methodology.

Under these conditions, the trace 82 of graph 80 in FIG. 10 is generated by computing the value of the signal bitb that results when the value of the signal bit is varied from Vss to Vcc in circuit 76 of FIG. 8. Trace 84 of FIG. 10 is generated by computing the value of the signal bit that results when the signal bitb is varied from Vss to Vcc in circuit 78 of FIG. 9.

As shown in FIG. 10, point X of box 86 is higher than point Y of box 86. As a result, the write margin is negative. Because the computed write margin is negative, the write operation is expected to fail.

Figure 11:
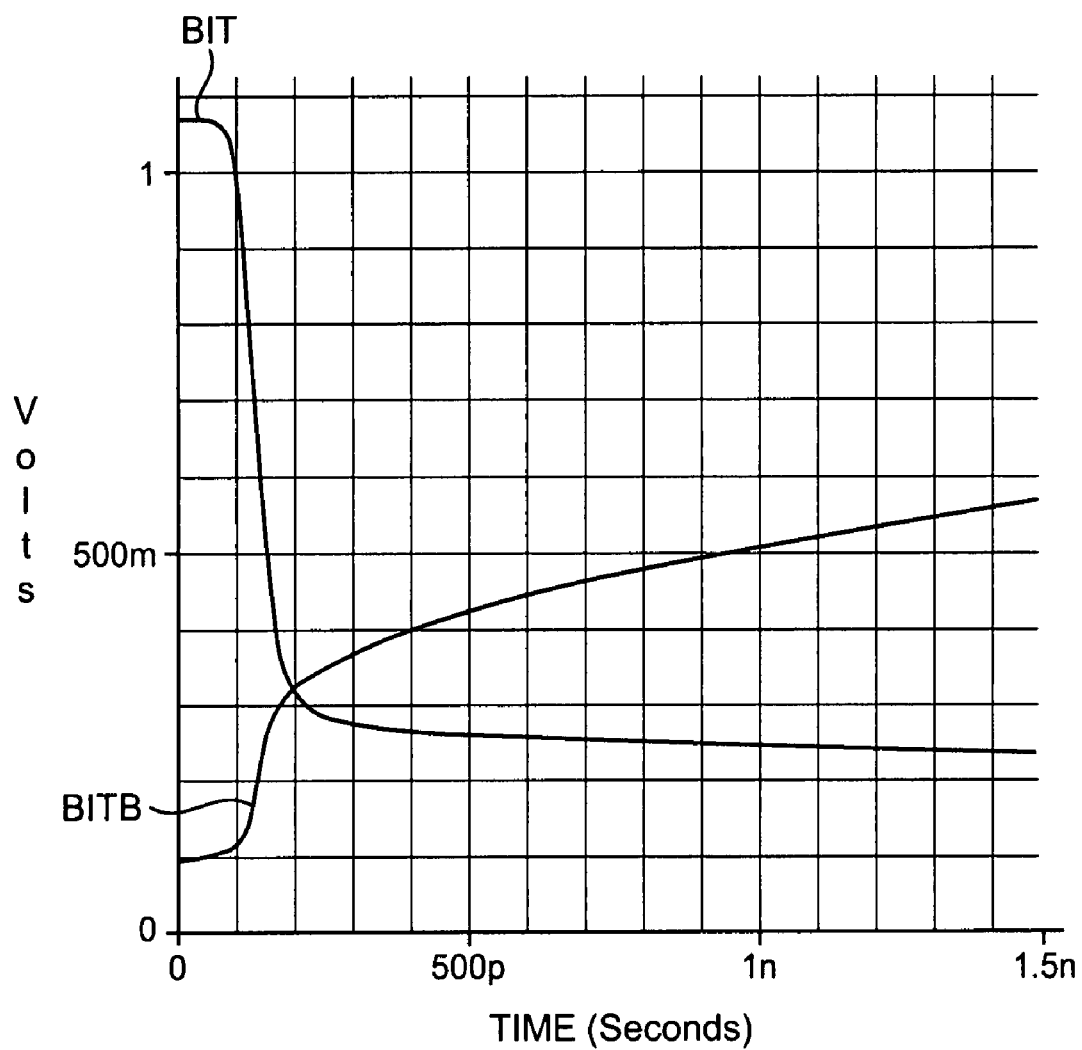
FIG. 11 is a graph of simulation results for a dual-port memory array cell showing how the cell can switch successfully despite being associated with a negative write margin value computed using the single-port memory cell write margin methodology.

However, transient simulation results obtained using a standard SPICE model indicate that the write operation will actually succeed. These simulation results, which are plotted in FIG. 11, show that the logic zero will be successfully written into the cell 70. Because the dual-port write-during-read operation succeeds even though the write margin computed using the conventional single-port write margin model is negative, the conventional single-port write margin model has poor predictive capabilities and cannot be reliably used for computing write margins in dual-port memory.

In accordance with the present invention, a dual-port memory array write margin model is provided that produces accurate write margin computations for dual-port memory. With the write margin computation approach of the invention, positive write margins accurately predict when write operations will be successful and negative write margins accurately predict when write operations will fail.

The write margin computations are performed by modifying the dual-port memory cell of interest to add two voltage sources. The added voltage sources represent differential noise on the memory cell and are therefore sometimes referred to as differential noise voltage sources. A series of transient simulations are run for different noise levels by adjusting the voltages produced by the differential noise voltage sources. The write margin for the cell corresponds to the maximum differential noise level that allows a successful write operation to be completed.

Figure 12:
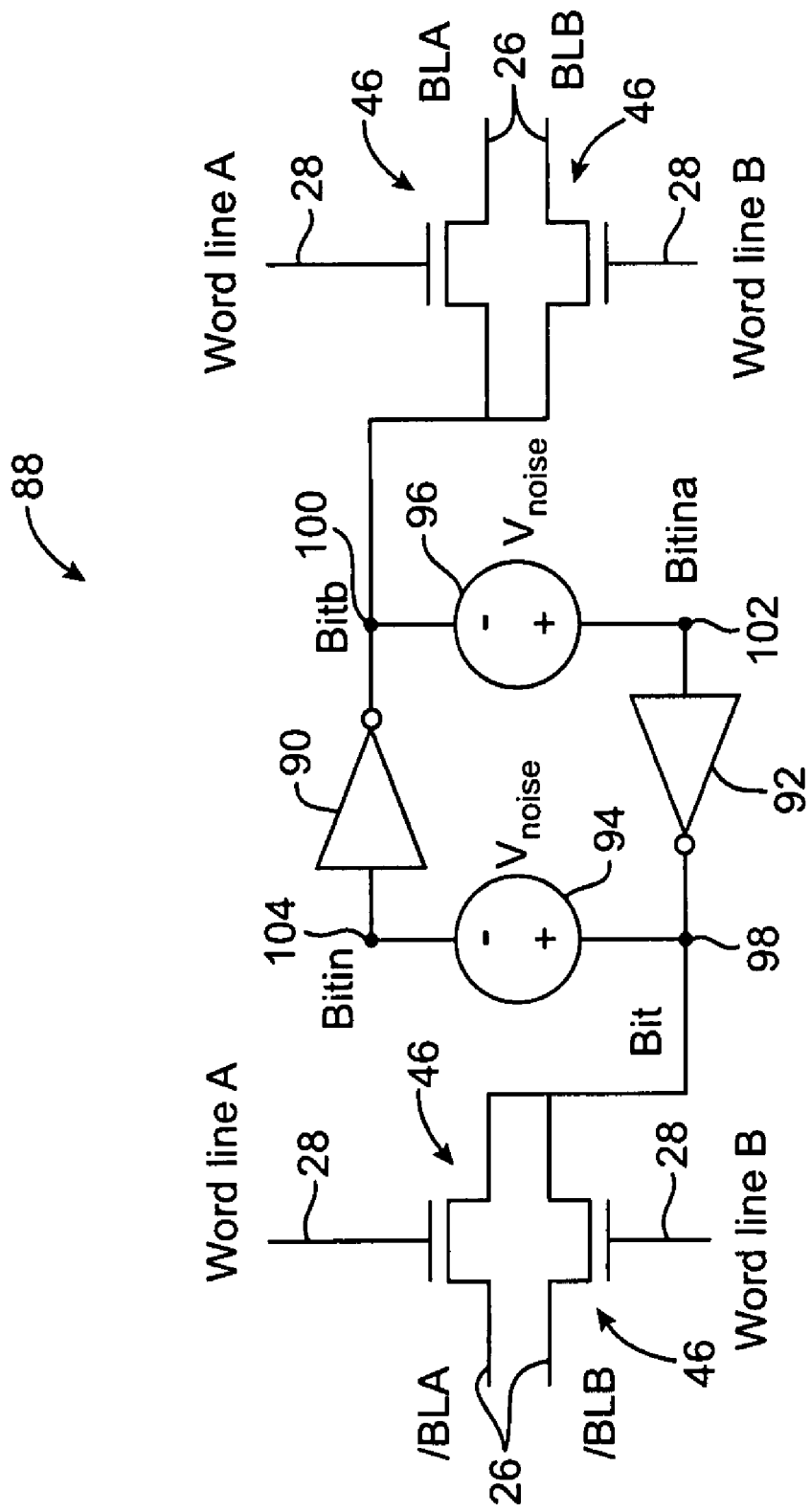
FIG. 12 is a diagram showing how two voltage sources representing differential noise can be incorporated into a dual-port memory array circuit as part of a write-margin calculation in accordance with the present invention.

An illustrative dual-port memory cell design that has been modified to incorporate the differential noise voltage sources used in the write margin calculations is shown in FIG. 12. As shown in FIG. 12, dual-port memory cell circuitry 88 has two cross-coupled inverters 90 and 92. Word lines 28 control respective address transistors 46 for port A and port B. Bit lines 26 have associated bit line signals BLA, /BLA, BLB, and /BLB. To compute the write margin for cell 88, cell 88 has been modified to include voltage source 94 and voltage source 96. Voltage sources 94 and 96 produce a DC voltage Vnoise and are used to represent differential noise on memory cell 88.

To compute the write margin for dual-port memory cell 88, the value of the voltage Vnoise is varied while transient simulations are performed to evaluate whether a write operation on cell 88 in the presence of the Vnoise signal would be successful. In a typical scenario, the simulations will indicate that write operations will be successful at certain low values of Vnoise. At larger values of Vnoise, the simulations will indicate that the write operations will fail. The value of Vnoise when the write operations begin to fail represents the noise margin of cell 88.

Figure 13:
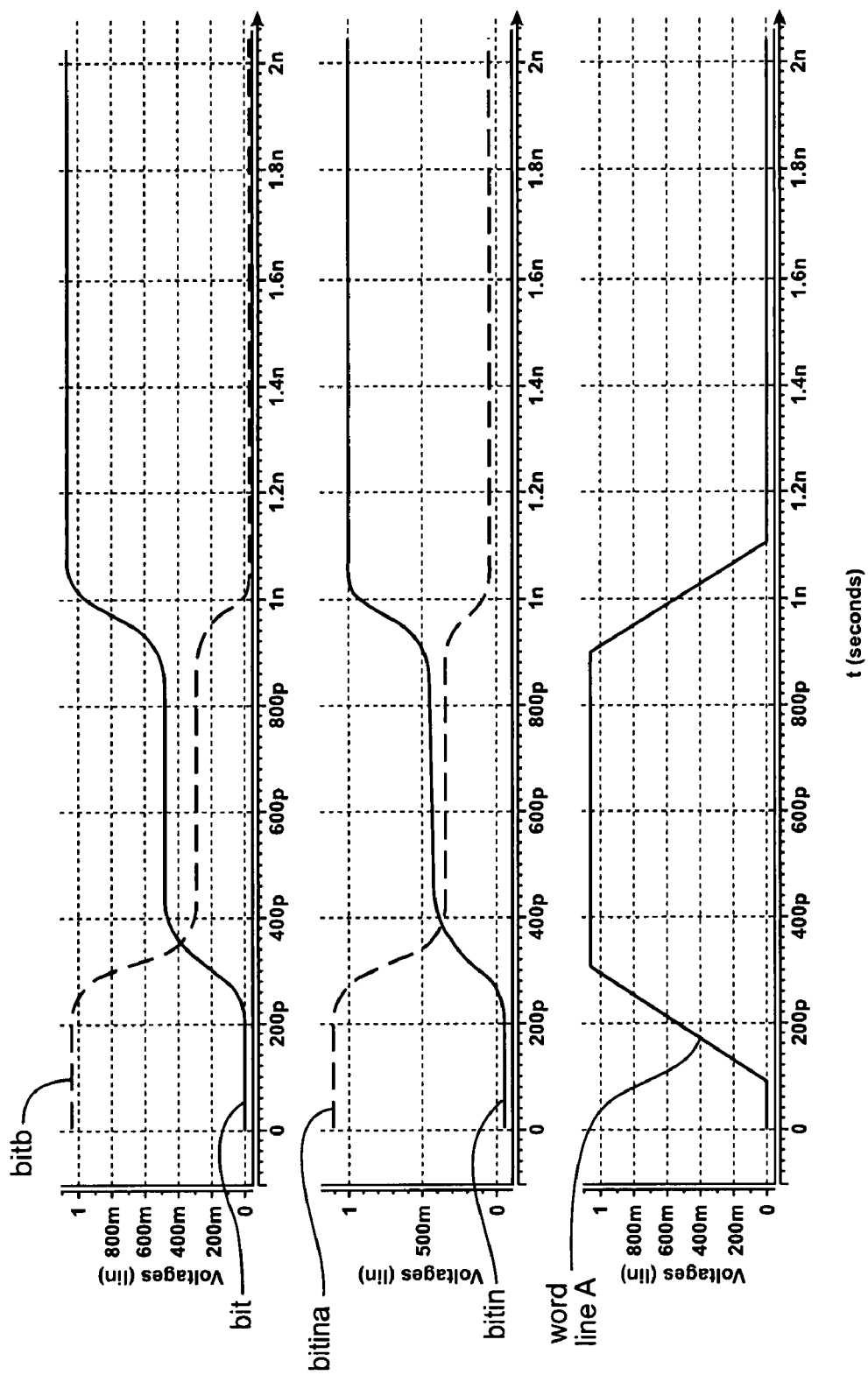
FIG. 13 is a graph of an illustrative simulated transient response using a noise voltage in the circuit of FIG. 12 that results in a successful write operation in accordance with the present invention.
Figure 14:
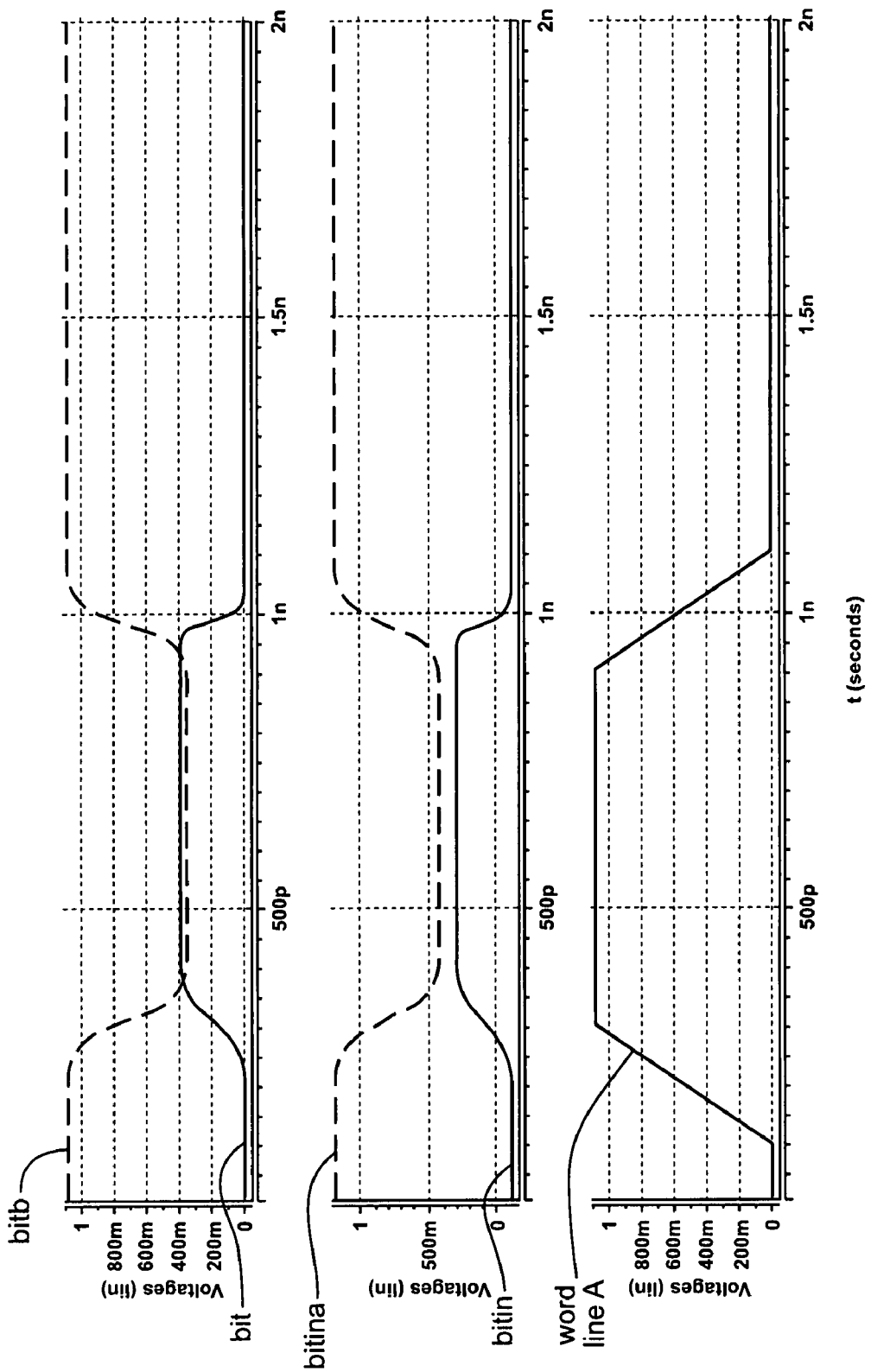
FIG. 14 is a graph of an illustrative simulated transient response using a noise voltage in the circuit of FIG. 12 that results in an unsuccessful write operation in accordance with the present invention.

FIGS. 13 and 14 contain simulation results for two voltages Vnoise. In the example of FIG. 13, the value of Vnoise is set at 50 mV. In the example of FIG. 14, the value of Vnoise is set at 100 mV. In both the FIG. 13 and FIG. 14 examples, a write operation is being attempted. It is assumed that the initial value of signal bit at node 98 is low, the initial value of the signal bitb at node 100 is high, and a logic one is being written into the cell 88.

As shown in the first graph of FIG. 13, at time t=0 seconds, the signal bit is at Vss (e.g., 0 volts) and the signal bitb is at 1.07 volts (Vcc). As shown in the second graph of FIG. 13, due to the presence of the 50 mV voltage on differential noise voltage source 96, the signal bitina on node 102 is 1.12 volts at time t=0 seconds. Because of the 50 mV voltage on differential noise voltage source 94, the voltage of signal bitin on node 104 is −50 mV at time t=0 seconds.

To write a one into cell 88, the bit line signal /BLA is high, while the bit line signal BLA is low. With these initial conditions, the word lines for port A are taken high at time t=100 ps, as shown in the third graph of FIG. 13. As address transistors 46 for port A are turned on, the high /BLA bit line signal drives node 98 and signal bit high, as shown by the solid line in the first graph of FIG. 13. At the same time, the low BLA bit line signal drives node 100 and signal bitb low, as shown by the dotted line in the first graph of FIG. 13.

The presence of the 50 mV of noise Vnoise on sources 96 and 94 makes it difficult to successfully complete the write operation. In particular, as signal /BLA is attempting to pull signal bit and bitin high, the 50 mV voltage on differential noise voltage source 94 is reducing the signal bitin by 50 mV. Because signal bitin is 50 mV lower than it would otherwise be, it is harder for signal bitin to drive inverter 90 to produce a logic zero at its output. Similarly, as signal BLA is attempting to pull signal bitb and bitina low, the 50 mV voltage on differential noise voltage source 96 is raising the voltage of signal bitina on node 102 by 50 mV, making it more difficult for signal bitina to flip the output of inverter 92 to a logic one.

Despite the deleterious effects of introducing the 50 mV differential noise signal represented by the 50 mV voltage on sources 94 and 96, the illustrative write operation of FIG. 13 is successful. At time t=900 ps, the word line signal on port A is deasserted. As shown in the first and second graphs of FIG. 13 the signals bit and bitin continue to switch from low to high and reach Vcc (1.07 volts) at about t=1.05 ns. At the same time, signals bitb and bitina fall successfully to Vss (0 volts). At times t greater than about 1.1 ns, the cell 88 is in a stable state with bit and bitin high and with bitb and bitina low (i.e., the logic one has been loaded).

Under the 50 mV noise conditions of FIG. 13, the write operation for cell 88 was successful. However, when the noise level is raised sufficiently, the write operation for cell 88 will not be successful. Consider, as an example, an attempt to write a logic one into the dual-port memory array cell 88 of FIG. 12 when the voltage produced by differential noise voltage sources 94 and 96 is 100 mV. The results of a time-dependent simulation using a SPICE model under these conditions are illustrated in FIG. 14.

As shown in the first graph of FIG. 14, at time t=0 seconds, the signal bit is at Vss (e.g., 0 volts) and the signal bitb is at 1.07 volts (Vcc). These are the same initial conditions used in the example of FIG. 13. The second graph of FIG. 14 shows how the signal bitina on node 102 is 1.17 volts at time t=0 seconds due to the presence of the 100 mV voltage on differential noise voltage source 96. The voltage of signal bitin on node 104 is −100 mV at time t=0 seconds, due to the 100 mV voltage on differential noise voltage source 94.

To write a logic one into cell 88, the bit line signal /BLA is taken high, while the bit line signal BLA is taken low. With these initial conditions, the word lines for port A are taken high at time t=100 ps, as shown in the third graph of FIG. 14. As the address transistors 46 for port A are turned on, the high /BLA bit line signal drives node 98 of cell 88 and signal bit high, as shown by the solid line in the first graph of FIG. 14. At the same time, the low BLA bit line signal drives node 100 of cell 88 and signal bitb low, as shown by the dotted line in the first graph of FIG. 13.

The presence of the 100 mV of noise Vnoise on sources 96 and 94 in the simulation of FIG. 14 makes it more difficult to successfully complete the write operation for cell 88 than the 50 mV noise signal Vnoise that was used in the simulation of FIG. 13. As signal /BLA is attempting to pull signal bit and bitin high, the 100 mV voltage on differential noise voltage source 94 is reducing the signal bitin by 100 mV. Because signal bitin is 100 mV lower than it would otherwise be, the signal bitin has difficulties in rising to a level sufficient to drive inverter 90 to produce a logic zero at its output. Similarly, as signal BLA is attempting to pull signal bitb and bitina low, the 100 mV voltage on differential noise voltage source 96 is raising the voltage of signal bitina on node 102 by 100 mV, creating a significant obstacle as signal bitina attempts to flip the output of inverter 92 to a logic one.

Unlike the situation in FIG. 13, in which the cell 88 was able to overcome the 50 mV differential noise signal represented by the 50 mV voltage on sources 94 and 96, in the FIG. 14 scenario the cell 88 is not able to overcome the 100 mV differential noise signal represented by the 100 mV voltage on sources 94 and 96. The illustrative write operation of FIG. 14 is therefore not successful.

The failure of the attempted write operation is shown in FIG. 14. At time t=900 ps, the word line signal on port A is deasserted. As shown by the solid lines in the first and second graphs of FIG. 14, the signals bit and bitin do not continue to switch from low to high as they did in FIG. 13. Rather, the signals bit and bitin revert to their initial low values once the word line on port A has been deasserted. Similarly, as shown by the dotted lines in the first and second graphs of FIG. 14, the signals bitb and bitina revert to their initial high values once the word line on port A has been taken low. At times t greater than about 1.1 ns, the cell 88 has completely reverted to its initial state with bit and bitin low and with bitb and bitina high. The cell 88 therefore continues to store a logic zero and the attempt to write a logic one into the cell 88 has failed.

As the examples of FIGS. 13 and 14 demonstrate, under some noise conditions a simulated write operation will succeed, whereas under other noise conditions the simulated write operation will fail. By systematically varying the voltage Vnoise on sources 94 and 96 while running time-dependent simulations of a write operation on dual-port memory array cell 88, the voltage level of the differential noise voltage source at which write operations are expected to fail can be identified. This voltage level can be used to represent the write margin for the dual-port memory array cell. If the write margin is greater than zero, write operations on the cell are expected to succeed. If the write margin is less than zero, write operations on the cell are expected to fail. Cells with relatively larger margins are expected to exhibit more reliable write performance than cells with relatively smaller margins.

Figure 15:
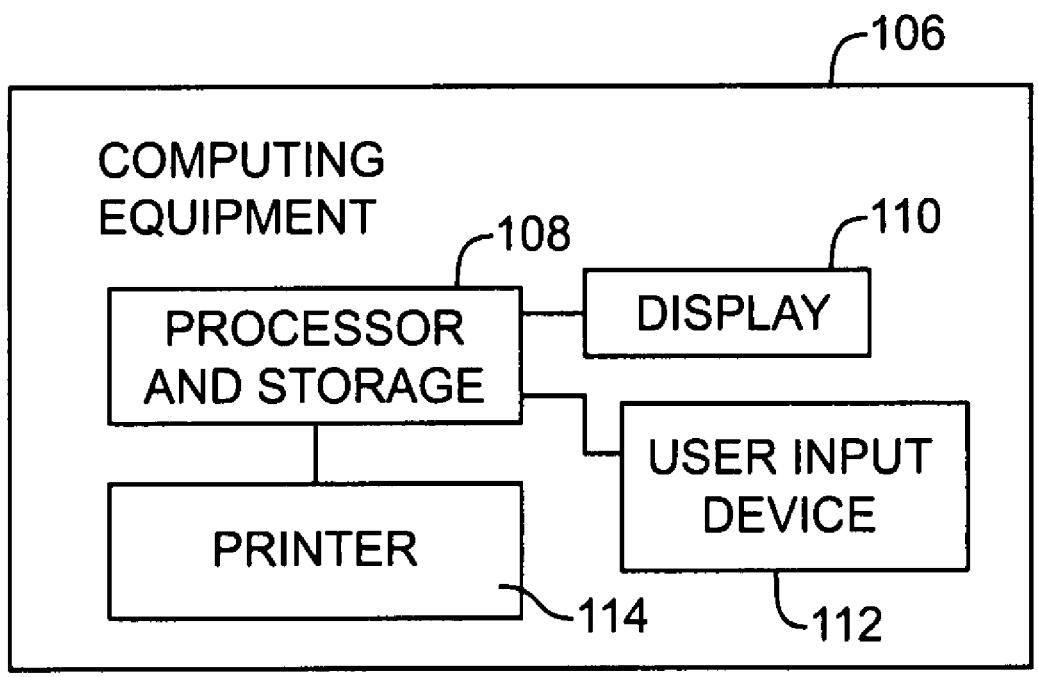
FIG. 15 is a diagram of illustrative computer system equipment that may be used to implement computer-based software tools in accordance with the present invention.

A write margin calculation tool suitable for calculating dual-port memory array write margins may be implemented on any suitable hardware platform. With one suitable approach, a write margin calculation tool may be implemented on computing equipment of the type shown in FIG. 15. As shown in FIG. 15, computing equipment 106 includes processor and storage 108. Computing equipment 106 may be based on a single computer, a group of stand-alone or networked computers, or any other suitable processor-based system. In networked environments, computers may be connected using a local area network and/or a wide area network (e.g., the internet). Processor and storage 108 may include microprocessors. Any suitable storage technology may be used in storage 108, including random-access memory, hard disk drives, optical drives, tape storage, etc.

The computing equipment 106 may have a display 110 for presenting results to a user. Display 110 may also be used to display selectable on-screen options for a user. The user may click on the displayed on-screen options using a mouse or other suitable pointing device, a keyboard, etc. User input interface devices such as a pointing device and keyboard are shown schematically in FIG. 15 as user input device 112.

The computing equipment 106 may produce output in any suitable format. For example, computed write margin results may be displayed on display 110. Printer 114 may be used to print reports containing write margin computations. Electronic output may also be generated (e.g., by storing write margin results in a file or other electronic data structure). If desired, electronic output may be stored in a shared database. Other applications such as computer-aided design tools running on computing equipment 106 may access the shared database.

Figure 16:
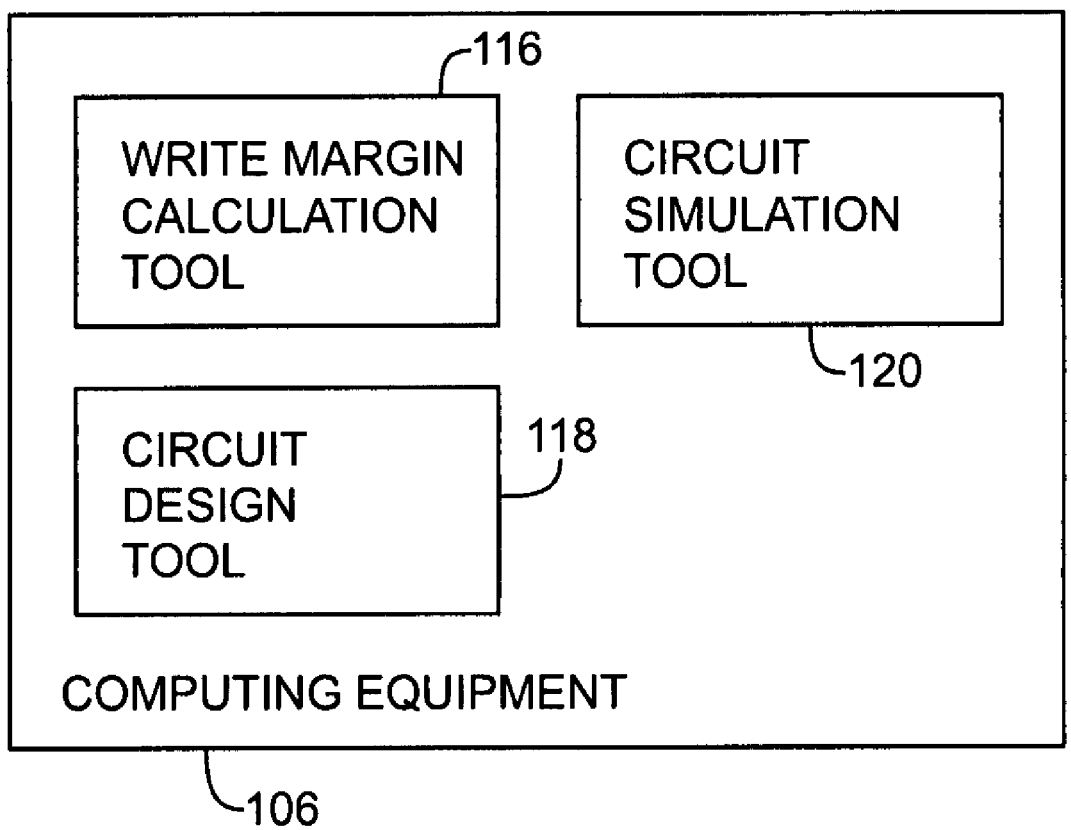
FIG. 16 is a diagram of illustrative computer-implemented software tools used in computing write margins for dual-port random-access-memory arrays in accordance with the present invention.

An illustrative write margin calculation tool 116 is shown FIG. 16. As described in connection with the simulations of FIGS. 13 and 14, dual-port memory cell write margin calculations involve performing time-dependent circuit simulations of write operations while systematically varying the value of Vnoise. Circuit design tool 118 may be used to generate design specifications for a dual-port memory cell. Circuit simulations may be performed using circuit simulation tool such as circuit simulation tool 120. Based on the results of a write margin computation, the cell 88 can be redesigned using circuit design tool 118. For example, if the results produced by write margin calculation tool 116 indicate that the write margin for a particular design is too small, the circuit design tool 118 may be used to adjust the sizes of certain transistors in cell 88 or to otherwise adjust the performance of the circuitry in cell 88 to ensure that a sufficiently large write margin is produced.

As shown in FIG. 16, write margin calculation tool 116, circuit simulation tool 120, and circuit design tool 118 may run on computing equipment 106. If desired, the functions of these software components may be implemented using multiple software modules or programs. For example, the functions of circuit simulation tool 120 and circuit design tool 118 may be implemented as a suite of programs. Write margin calculation tool 116 may be implemented as a script (macro) that interacts with circuit design tool 118 and circuit simulation tool 120. Tools 116, 120, and 118 may, if desired, interact through one or more shared databases. The functions of tools 116, 120, and 118 may also be combined. For example, the circuit simulation functions of tool 120 or the design input functions of circuit design tool 118 may be incorporated into write margin calculation tool 116.

Figure 17:
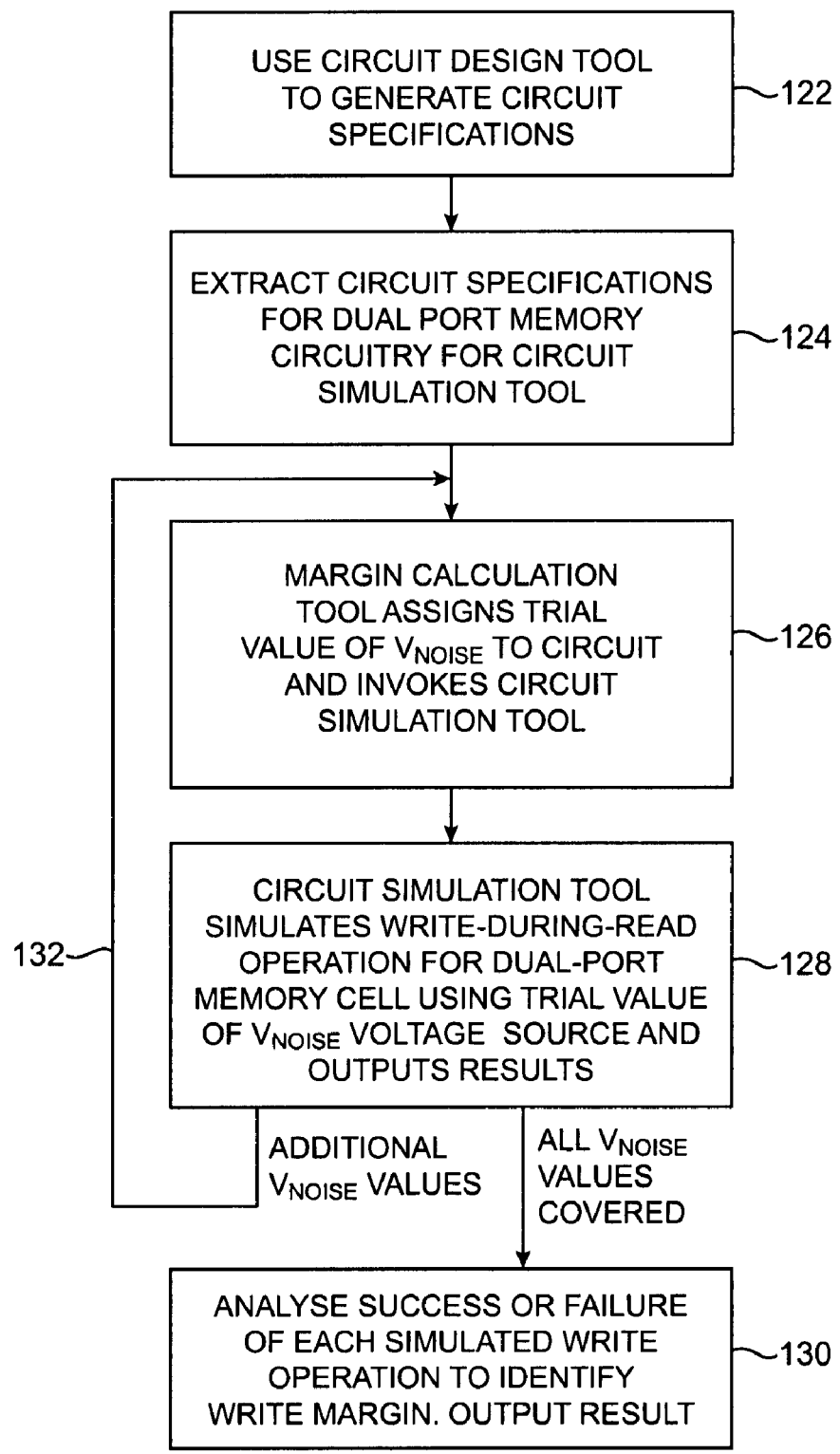
FIG. 17 is a flow chart of illustrative steps involved in using the computing equipment of FIG. 15 and the tools of FIG. 16 in computing the write margin of a dual-port memory array cell in accordance with the present invention.

Illustrative steps involved in using write margin calculation tool 116 of FIG. 16 to compute a write margin for a dual-port memory array cell of the type shown in FIG. 2 are shown in FIG. 17. During operation of the tools of FIG. 16, executable software runs on the processors 108 of the computing equipment 106 (FIG. 15). The storage 108 of the computing equipment 106 (FIG. 15) is used to store data for the operation of the tools of FIG. 16. In general, software may be stored on any computer-readable medium (storage). When the software of the tools is installed, the processing circuitry and storage of the tools have instructions and data that cause the computing equipment in the tools to execute various methods (processes). When performing these processes, the computing equipment is configured to implement the functions of the tools that are described in connection with FIG. 17.

At step 122 of FIG. 17, a user uses circuit design tool 118 to design a dual-port memory array cell such as a dual-port memory cell of the type shown in FIG. 2. To support write margin computations, the user of the system uses tool 118 to modify the cell to include differential noise voltage sources 94 and 96 of the type shown in FIG. 12. Circuit design tool 118 generates circuit specifications that define the circuit characteristics of the components of the modified cell.

To ensure that the performance of the modified cell is modeled accurately, the circuit specifications that are generated preferably include RC loading effects from ancillary circuitry. For example, RC loading effects due to the presence of bit lines 26 are preferably included. If the memory array includes bit line voltage clamping circuitry of the type shown in FIG. 1, RC loading effects from the presence of the bit line voltage clamping circuitry can be modeled in the circuit specifications. Each port can be modeled differently. For example, on the memory cell port being used for read operations, RC loading effects from the presence of the bit line clamping circuitry and the effects of the clamped voltages can be modeled, while on the memory cell port being used for write operations, only the RC loading effects arising from the use of the bit line voltage clamping circuitry are modeled.

The circuit specifications generated by the tool 118 also preferably take into account the switching speed for word line drivers 29. For example, the switching speed for word line drivers 29 can be modeled by assuming each word line signal switches from high to low and from low to high using a linear ramp function as shown in the examples of FIGS. 13 and 14.

Dual-port memory arrays contain numerous individual memory cells, each of which may be influenced by a different set of fabrication variations and operating condition variations. To ensure that write margin calculations for the cell are representative of all of the cells in the array, a worst case set of circuit characteristics is preferably used for the circuit specifications.

After the user has used circuit design tool 118 to generate specifications for the dual-port memory cell (including the modification to the cell to include the differential noise source voltage sources), the circuit specifications are provided to the circuit simulation tool 100 at step 124. With one suitable arrangement, the user extracts the circuit specifications from an integrated circuit design in circuit design tool 118 and stores the extracted circuit specifications in a database that is accessible to tool 120 and/or tool 116.

At step 126, the margin calculation tool 116, assigns a trial noise voltage to the differential noise voltage sources 94 and 96. The margin calculation tool 116 invokes the circuit simulation tool 120 to simulate the memory cell's write performance using the trial noise voltage.

At step 128, the circuit simulation tool 120 or a circuit simulation tool that has been incorporated into tool 116 simulates a write-during-read operation for the dual-port memory array cell. Because a read operation is taking place during the write, the read bit lines are connected to the cell and RC loading effects due to the presence of the read bit lines are preferably taken into account. If the bit line read-write circuitry in the user's design includes bit line voltage clamping circuitry such as bit line voltage clamping circuitry 27 of FIG. 1, the effects of the clamped bit line voltages are also taken into account in the simulation.

The circuit simulation tool 120 preferably simulates the write operation using a time-dependent model such as the well-known SPICE model. By computing the transient response of the dual-port memory array cell under varying noise conditions, the performance of the cell can be evaluated accurately. The results of the circuit simulation performed by circuit simulation tool 120 may include graphs of the type shown in FIGS. 13 and 14. Simulation results can also be expressed as successes or failures. For example, a logic one may be generated for a successful write operation and a logic zero may be generated for a failed write operation. Switching times and other characteristics of the write operation may also be gathered. The circuit simulation tool 120 and/or write margin calculation tool 116 preferably store these simulation results in storage 108 (FIG. 15).

As shown by line 132, the operations of steps 126 and 128 are repeated for multiple values of Vnoise. This allows a range of possible noise values to be evaluated. Any suitable range of noise values may be evaluated if desired. For example, Vnoise may be swept through a range from −1.0 volts to 1.0 volts in 1 mV, 10 mV, or 50 mV steps.

After write-during-read transient simulations have been performed for all desired differential noise settings on voltage sources 94 and 96, the results of the transient simulations can be analyzed to determine the write margin (step 130). With one suitable analysis arrangement, the success or failure of each attempted write operation is used to determine the write margin. The differential noise voltage level above which writing operations fail defines the noise margin. If, for example, simulations indicate that write operations succeed for noise levels of 10 mV, 20 mV, and 30 mV, but fail for noise levels of 40 mV and 50 mV, it can be concluded that the write margin for the cell is 30 mV. In the example of FIGS. 13 and 14, write operations with a noise level setting of 50 mV succeed (FIG. 13), whereas write operations with a noise level setting of 100 mV fail, so the write margin calculation tool 116 concludes that the write margin is 50 mV.

The results of the write margin determination of step 130 are output to the user. The write margin value may be displayed on display 110 (FIG. 15), may be printed using printer 114 (FIG. 15), or may be incorporated into an electronic output (e.g., by storing the result in a file in storage 108). The computed write margin can be evaluated by the user to determine a suitable course of action. For example, if the write margin is sufficiently large, the dual port memory cell design (without the differential noise voltage sources) can be used in fabricating an integrated circuit. If the write margin is insufficiently large, the user can make appropriate design modifications using circuit design tool 118. If desired, the circuit design tool can make modifications automatically based on electronic feedback from the write margin calculation tool 116.

The foregoing is merely illustrative of the principles of this invention and various modifications can be made by those skilled in the art without departing from the scope and spirit of the invention.

What is claimed is:

1. A method for computing, with computing equipment, a write margin for a dual-port memory array cell comprising:
with computing equipment, modifying the dual-port memory array cell to include a differential noise source;
with computing equipment, systematically varying a voltage setting for the differential noise source while performing write operation transient simulations for the modified dual-port memory array cell; and
using results from the write operation transient simulations to determine the write margin for the dual-port memory array cell.

2. The method defined in claim 1 further comprising:
with a circuit design tool, designing the dual-port memory array cell, wherein modifying the dual-port memory array cell to include the differential noise source comprises using the circuit design tool to modify the dual-port memory array cell to include the differential noise source.

3. The method defined in claim 1 wherein the dual-port memory array cell comprises a first inverter having an input connected to a first node and an output connected to a second node and a second inverter having an input connected to a third node and an output connected to a fourth node, wherein the differential noise source comprises a first voltage source connected between the first node and the fourth node and a second voltage source connected between the second node and the third node, and wherein systematically varying the voltage setting for the differential noise source comprises systematically varying how much voltage is produced by the first and second voltage sources.

4. The method defined in claim 1 wherein the dual-port memory array cell comprises first, second, third, and fourth address transistors, wherein the first and second address transistors form a first port and the third and fourth address transistors form a second port, a first inverter having an input connected to a first node and an output connected to a second node, wherein the first address transistor is connected to the first node and the second address transistor is connected to the second node, a second inverter having an input connected to a third node and an output connected to a fourth node, wherein the third address transistor is connected to the third node and the fourth address transistor is connected to the fourth node, wherein the differential noise source comprises a first voltage source connected between the first node and the fourth node and a second voltage source connected between the second node and the third node, and wherein systematically varying the voltage setting for the differential noise source comprises systematically varying how much voltage is produced by the first and second voltage sources.

5. The method defined in claim 1 wherein the voltage settings for the differential noise source are associated with different noise levels and wherein using the results from the write operation transient simulations to determine the write margin for the dual-port memory array cell comprises evaluating whether write operations on the dual-port memory array cell in the presence of each of the different noise levels are successful.

6. The method defined in claim 1 wherein the voltage settings for the differential noise source are associated with different noise levels and wherein using the results from the write operation transient simulations to determine the write margin for the dual-port memory array cell comprises analyzing write operation successes and write operation failures associated with the write operation transient simulations to identify the write margin.

7. The method defined in claim 1 wherein the voltage settings for the differential noise source are associated with different noise levels, wherein using the results from the write operation transient simulations to determine the write margin for the dual-port memory array cell comprises analyzing write operation successes and write operation failures associated with the write operation transient simulations to identify the write margin, and wherein the write margin for the dual-port memory array cell corresponds to a maximum differential noise level that is associated with a write operation success.

8. Software on a computer-readable storage medium for computing a write margin for a dual-port memory array cell, wherein a user modifies the dual-port memory array cell to include a differential noise source to facilitate computation of the write margin, the software comprising:
code on the computer-readable storage medium for performing write operation transient simulations for the modified dual-port memory array cell while a voltage setting for the differential noise source is systematically varied; and
code on the computer-readable storage medium for analyzing results from the write operation transient simulations to determine the write margin for the dual-port memory array cell.

9. The software defined in claim 8 further comprising:
code for modifying the dual-port memory array cell to include the differential noise source.

10. The software defined in claim 8 wherein the dual-port memory array cell comprises a first inverter having an input connected to a first node and an output connected to a second node and a second inverter having an input connected to a third node and an output connected to a fourth node, wherein the differential noise source comprises a first voltage source connected between the first node and the fourth node and a second voltage source connected between the second node and the third node, and wherein the code for performing the write operation transient simulations while the voltage setting for the differential noise source is systematically varied comprises code for performing the write operation transient simulations while systematically varying how much voltage is produced by the first and second voltage sources.

11. The software defined in claim 8 wherein the dual-port memory array cell comprises first, second, third, and fourth address transistors, wherein the first and second address transistors form a first port and the third and fourth address transistors form a second port, a first inverter having an input connected to a first node and an output connected to a second node, wherein the first address transistor is connected to the first node and the second address transistor is connected to the second node, a second inverter having an input connected to a third node and an output connected to a fourth node, wherein the third address transistor is connected to the third node and the fourth address transistor is connected to the fourth node, wherein the differential noise source comprises a first voltage source connected between the first node and the fourth node and a second voltage source connected between the second node and the third node, and wherein the code for performing the write operation transient simulations comprises code for systematically varying how much voltage is produced by the first and second voltage sources.

12. The software defined in claim 8 wherein the voltage settings for the differential noise source are associated with different noise levels and wherein the code for analyzing the results from the write operation transient simulations to determine the write margin for the dual-port memory array cell comprises code for evaluating whether write operations on the dual-port memory array cell in the presence of each of the different noise levels are successful.

13. The software defined in claim 8, wherein the dual-port memory array cell comprises four address transistors and two inverters, wherein the voltage settings for the differential noise source are associated with different noise levels, and wherein the code for analyzing the results from the write operation transient simulations to determine the write margin for the dual-port memory array cell comprises code for analyzing write operation successes and write operation failures associated with the write operation transient simulations to identify the write margin.

14. The software defined in claim 8 wherein the voltage settings for the differential noise source are associated with different noise levels, wherein the code for analyzing the results from the write operation transient simulations to determine the write margin for the dual-port memory array cell comprises code for analyzing write operation successes and write operation failures associated with the write operation transient simulations to identify the write margin, and wherein the write margin for the dual-port memory array cell corresponds to a maximum differential noise level that is associated with a write operation success.

15. Computing equipment for computing a write margin for a dual-port memory array cell, comprising:
 a circuit design tool with which a user modifies the dual-port memory array cell to include a differential noise source to facilitate computation of the write margin;
 a circuit simulation tool that performs write operation transient simulations for the modified dual-port memory array cell while a voltage setting for the differential noise source is systematically varied; and
 a write margin calculation tool that analyzes results from the write operation transient simulations to determine the write margin for the dual-port memory array cell.

16. The computing equipment defined in claim 15 wherein the dual-port memory array cell comprises a first inverter having an input connected to a first node and an output connected to a second node and a second inverter having an input connected to a third node and an output connected to a fourth node, wherein the differential noise source comprises a first voltage source connected between the first node and the fourth node and a second voltage source connected between the second node and the third node, and wherein the computing equipment comprises equipment configured to systematically vary how much voltage is produced by the first and second voltage sources when the circuit simulation tool performs the write operation transient simulations.

17. The computing equipment defined in claim 15 wherein the dual-port memory array cell comprises first, second, third, and fourth address transistors, wherein the first and second address transistors form a first port and the third and fourth address transistors form a second port, a first inverter having an input connected to a first node and an output connected to a second node, wherein the first address transistor is connected to the first node and the second address transistor is connected to the second node, a second inverter having an input connected to a third node and an output connected to a fourth node, wherein the third address transistor is connected to the third node and the fourth address transistor is connected to the fourth node, wherein the differential noise source comprises a first voltage source connected between the first node and the fourth node and a second voltage source connected between the second node and the third node, and wherein the computing equipment comprises equipment configured to systematically vary how much voltage is produced by the first and second voltage sources when the circuit simulation tool performs the write operation transient simulations.

18. The computing equipment defined in claim 15 wherein the voltage settings for the differential noise source are associated with different noise levels and wherein the write margin calculation tool code is configured to evaluate whether write operations on the dual-port memory array cell in the presence of each of the different noise levels are successful.

19. The computing equipment defined in claim 15 wherein the voltage settings for the differential noise source are associated with different noise levels and wherein the write margin calculation tool code is configured to determine the write margin for the dual-port memory array cell by analyzing write operation successes and write operation failures associated with the write operation transient simulations at each of the different voltage settings.

20. The computing equipment defined in claim 15 wherein the voltage settings for the differential noise source are associated with different noise levels, wherein the write margin calculation tool code is configured to determine the write margin for the dual-port memory array cell by analyzing write operation successes and write operation failures associated with the write operation transient simulations at each of the different voltage settings and wherein the write margin for the dual-port memory array cell corresponds to a maximum differential noise level for which the write operation transient simulation is associated with a write operation success.

* * * * *